United States Patent Office 2,783,541
Patented Mar. 5, 1957

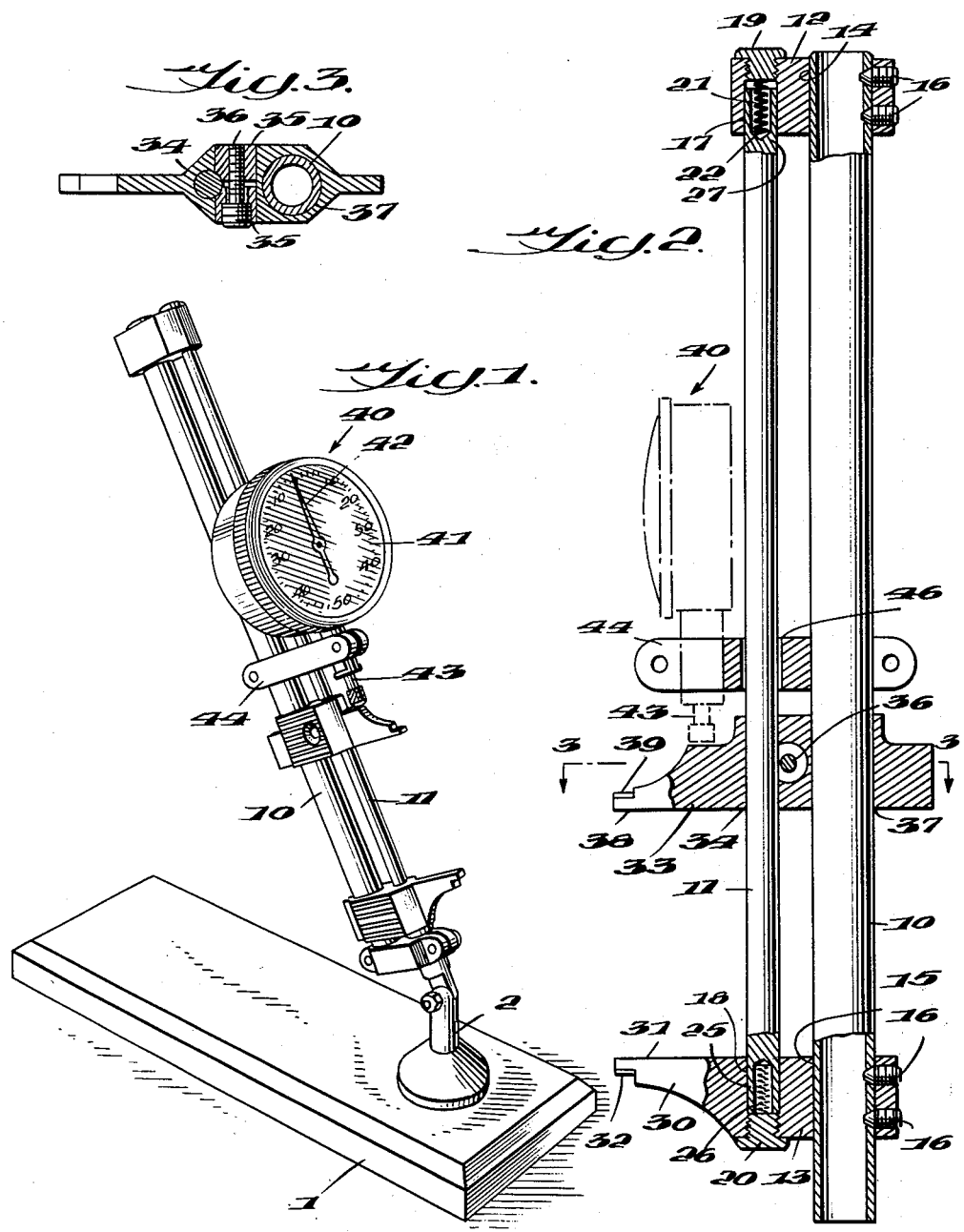

2,783,541

GAUGING APPARATUS

Gerard A. Naab, Morton, Pa., assignor to Fox Products Company, Philadelphia, Pa., a corporation of Pennsylvania Application February 11, 1955, Serial No. 487,546

4 Claims. (Cl. 33—147)

This invention relates to gauging apparatus, and, more particularly to a relatively simple gauge for production checking.

Many types of gauges have been designed for checking machined pieces to insure their dimensions conform to design. The well-known "snap" gauges, and the various "go-no-go" gauges are examples. However, when a number of different types of dimensions have to be checked, ordinarily several different gauges are necessary. Because of the cost and the inconvenience of changing from one gauge to another, this is objectionable. For instance, an inspector may have to check diameters of cylindrical pieces, either over the diameter or at the end, lengths of pieces, and many other dimensions, such as distance between grooves and distance from a shoulder to an end. Further, the dimensions to be checked may be in locations difficult or impossible to get to with snap gauges or micrometers. A separate gauge for each of these uses would be extremely expensive, as well as inconvenient.

The apparatus of the present invention is designed to furnish a single gauge usable for all the above purposes, yet which is relatively strong and simple in construction, easy to operate, and inexpensive to manufacture.

The gauging apparatus of this invention comprises a pair of rigid elongated bars, one of which is supported by the other and movable along its length relative to the other, a pair of gauging members, one mounted on the fixed bar and the other mounted on the movable bar and a plunger-operated dial gauge fixed on the fixed bar and having its operating plunger controlled by the gauging member mounted on the movable bar. The gauging members preferably have both internal and external gauging surfaces, and the movable bar is designed to be urged in either direction along its length, so that both internal and external dimensions may be checked.

The apparatus of the invention will now be described in conjunction with the accompanying drawing, showing a preferred embodiment of the invention.

In the drawing:

Fig. 1 is a perspective view showing the gauging apparatus mounted on a base;

Fig. 2 is an elevational view, partly in section, of the gauging apparatus alone; and, Fig. 3 is a sectional view taken along line 3—3 of Fig. 2.

The gauging apparatus is shown in Fig. 1 mounted on a base 1 by a conventional standard, generally indicated at 2, and adjustable to permit location of the gauging apparatus in any convenient position. With such an arrangement, the gauging apparatus may be mounted on a bench to which pieces to be checked may be brought. However, if pieces are to be checked away from a bench, for instance while held in the machine, the gauging apparatus may be detached from the base and standard, as shown in Fig. 2.

The gauging apparatus includes a rigid elongated bar 10, which may be of metal or any other appropriate material, and may be cylindrical in shape. Bar 10 will be referred to as the fixed bar, while a second rigid elongated bar 11 will be referred to as the movable or slidable bar. Bar 11 is mounted parallel to bar 10 by bearing members 12 and 13, which may be mounted adjacent the opposite ends of the fixed bar.

Bearing members 12 and 13 preferably have cylindrical passages 14 and 15, respectively therethrough, into which the opposite ends of fixed bar 10 fit, and the members may be locked in place on the fixed bar by means of set screws 16. The bearing members also have walls defining cylindrical chambers 17 and 18, respectively, extending therethrough parallel to passages 14 and 15, and the movable or slidable bar 11 has its opposite ends projecting into these chambers and slidable with respect to their walls. Each of the bearing members has a retaining screw, 19 and 20, respectively, threaded into the outer end of the chambers 17 and 18 to define the most remote ends of said chambers. As will be evident from Fig. 2, the distance between the most remote ends of chambers 17 and 18, or the inner sides of retaining screws 19 and 20, is smaller than the total length of movable bar 11, so that the movable bar may be slid a limited distance with respect to the fixed bar. A spring 21 is shown positioned in the chamber 17 having one of its ends bearing against retaining screw 19 and its opposite end bearing against the innermost surface of a slot 22 in the movable bar. The spring yieldingly urges end 25 of the movable bar against the inner side of retaining screw 20, but end 25 of the movable bar also has a slot 26 therein, and it will be obvious that spring 21 could be positioned in chamber 18 to urge end 27 of the movable bar against the inner side of retaining screw 19, as shown dotted in Fig. 2.

Bearing member 13 has an extension forming a first gauging member 30, which has an inner gauging surface 31 extending substantially perpendicularly to the fixed and movable bars. Gauging member 30 also has an outer gauging surface 32 likewise perpendicular to the fixed and movable bars.

A second gauging member 33 has a partial-cylindrical passage 34 therethrough whose inner surface is partially defined by a pair of threaded blocks 35, as shown in Fig. 3. A screw 36 extends through a passage in one of said blocks and is threaded into the other of said blocks and operable to secure the gauging member to movable bar 11 or release it therefrom, by moving the blocks toward or away from each other. The second gauging member also has a second cylindrical passage 37 through which fixed bar 10 passes, the passage being large enough that the second gauging member may move with the slidable bar along the fixed bar.

The second gauging member 33 has an inner gauging surface 38 facing and extending parallel to the inner gauging surface 31 of gauging member 30, and an outer gauging surface 39 extending parallel to outer gauging surface 32 of gauging member 30.

In order to indicate the extent of the sliding movement of movable bar 11 with respect to fixed bar 10, a dial indicator gauge 40 is provided. The dial indicator gauge includes a dial indicator 41 of the center zero type having a pointer 42 cooperating with the scale of the indicator. The position of the pointer is determined by the position of an operating plunger 43 which bears against a surface of gauging member 33 remote from gauging member 30. The dial indicator gauge 40 is mounted on the fixed bar 10 by means of a releasable clamp 44, which may have a clearance hole 46 for the movable bar 11.

The operation of the gauging apparatus of the invention will now be described, first for measuring external dimensions.

For measuring external dimensions such as outer diameters, the inner gauging surfaces 31 and 38 of gauging members 30 and 33 are used, and spring 21 is positioned in chamber 17 of bearing 12 to urge slidable bar 11 downwardly, as shown in Fig. 2. The master piece, against which dimensions of the machined pieces are to be checked, is then set between gauging members 30 and 33, more specifically inner gauging surfaces 31 and 38 of these members. Screw 36, which locks gauging member 33 to slidable bar 11, is then released and the gauging member re-positioned on the slidable bar so that, when inner gauging surface 38 and inner gauging surface 31 are touching the master piece along the dimension in question, and gauging member 33 is locked to the slidable bar, the slidable bar is about half-way along its travel between the most remote ends of chambers 17 and 18 in bearings 12 and 13. Clamp 44 is then released and the position of dial gauge 40 adjusted along the fixed bar to a place where the operating plunger 43 of the gauge is about half-way in its travel between its most-retracted position and its most advanced position. The indicator dial 41 of the gauge may be of the usual rotatable type, in which case the dial will now be set so that the pointer is opposite zero on the scale. The gauging apparatus is now ready to measure variations from the dimension of the master piece, and when the machined pieces are placed between the gauging members 30 and 33, the indicator will read the amount and direction of variations of the piece's dimension from that of the master piece.

If an internal dimension is to be checked, screw 19 is taken out of chamber 17, and spring 21 removed from the chamber. Screw 19 is then replaced and spring 21 placed in chamber 18, as shown dotted in Fig. 2. The master piece is then placed with the bounding surfaces of the dimension in question against outer gauging surfaces 32 and 39 of the gauging members. The gauging apparatus is then prepared for operation in the same manner as that described for external checking, and the same indications will then be obtained.

It will be seen that the apparatus described constitutes a simple device easily manipulated and carried from place to place, yet usable for a large number of gauging applications. It will also be obvious that many minor changes could be made in the specific embodiment herein disclosed, without departure from the scope of this invention. Accordingly, the invention is not to be considered limited to the specific embodiment described, but only by the scope of the appended claims.

I claim:

1. A gauging apparatus including a first rigid elongated bar, a second rigid elongated bar, a pair of bearing members fixedly mounted adjacent opposite ends of said first bar for holding the second bar substantially parallel to the first bar, said bearing members having walls defining chambers therein extending substantially parallel to the first bar, the opposite ends of said second bar projecting into said chambers and slidable therein to allow movement of the second bar with respect to the first bar only along its own length, the length of said second bar being smaller than the distance between the most remote ends of said chambers, a spring between the most remote end of one of said chambers and the adjacent end of said second bar for resiliently urging the remote end of the second bar against the remote end of the chamber into which said remote end of the bar fits, a first gauging member forming an extension of the bearing member at one end of the first bar and having a gauging surface extending substantially perpendicularly to both of said bars, a second gauging member mounted on said second bar and having a gauging surface extending substantially parallel to said gauging surface of said first gauging member, and a dial gauge fixed on said first bar between said second gauging member and the bearing adjacent the other end of the first bar, said dial gauge having an operating plunger contacting a surface of the second gauging member.

2. A gauging apparatus as defined in claim 1 in which said gauging surfaces of the first and second gauging members are on the sides of said gauging members facing each other, and said spring is in the chamber of the bearing remote from the bearing of which the first gauging member forms an extension.

3. A gauging apparatus as defined in claim 1 in which said gauging surfaces of the first and second gauging members are on the sides of said gauging members remote from each other, and said spring is in the chamber of the bearing of which the first gauging member forms an extension.

4. A gauging apparatus including a first rigid elongated bar, a second rigid elongated bar, bearing means on said first bar for mounting the second bar substantially parallel to the first bar for movement only along its own length relative to the first bar including a pair of bearings mounted adjacent opposite ends of the first bar and having walls defining chambers extending substantially parallel to the first bar into which the opposite ends of said second bar project. The length of said second bar being smaller than the distance between the most remote ends of said chambers, a spring in one of said chambers for resiliently urging the remote end of the second bar against the remote end of the chamber into which said remote end of the bar fits, a first gauging member fixed on the first bar, a second gauging member fixed to the second bar, a dial gauge mounted on the first bar and having a plunger positioned to contact the surface of the second gauging member, said plunger being movable with movement of the second gauging member to change the position of the pointer of the dial gauge.

References Cited in the file of this patent

UNITED STATES PATENTS

| 851,507 | Fetherolf | Apr. 23, 1907 |
| 2,636,278 | Krause | Apr. 28, 1953 |

FOREIGN PATENTS

| 84,465 | Switzerland | Aug. 2, 1920 |
| 369,503 | Germany | Feb. 20, 1923 |